United States Patent [19]

Sgariboldi

[11] Patent Number: 5,395,286
[45] Date of Patent: Mar. 7, 1995

[54] APAPRATUS FOR CUTTING AND MIXING FIBROUS PRODUCTS

[75] Inventor: Giuseppi Sgariboldi, Camairago, Italy

[73] Assignee: Sioux Automation Center, Inc., Sioux Center, Iowa

[21] Appl. No.: 53,611

[22] Filed: Apr. 26, 1993

Related U.S. Application Data

[63] Continuation-in-part of Ser. No. 64,241, Dec. 3, 1992.

[51] Int. Cl.$^6$ .......................... A01F 29/00; B01F 7/08
[52] U.S. Cl. ................................. 460/23; 56/16.4 D; 366/603
[58] Field of Search ......... 460/23; 56/16.4 D, 16.4 A; 366/156, 157, 603

[56] References Cited

U.S. PATENT DOCUMENTS

| | | |
|---|---|---|
| 2,708,935 | 5/1955 | Bauer ................................. 460/23 X |
| 3,642,254 | 2/1972 | Ternes ............................. 366/603 X |
| 3,995,836 | 12/1976 | Carter et al. ................... 366/603 X |

FOREIGN PATENT DOCUMENTS 2009608  6/1978  United Kingdom ............... 366/603

Primary Examiner—Terry Lee Melius
Attorney, Agent, or Firm—Timothy J. Martin

[57] ABSTRACT

An apparatus for the cutting and mixing of fibrous products for the preparation of animal feed which includes a hopper where equipments for the cutting and mixing of fibrous product are installed. Based on this invention, such mixing and cutting equipment is constituted by one auger that is separated into two equal (welded) sections by a partition that is attached to the shaft of the auger itself. The auger is equipped with a first section of auger blades that turn clockwise and a second section of auger blades that turn counterclockwise. The hopper has a bottom that is partially cylindrical where the auger is installed and one wall extends vertical and the opposite one extends oblique from the bottom.

3 Claims, 6 Drawing Sheets

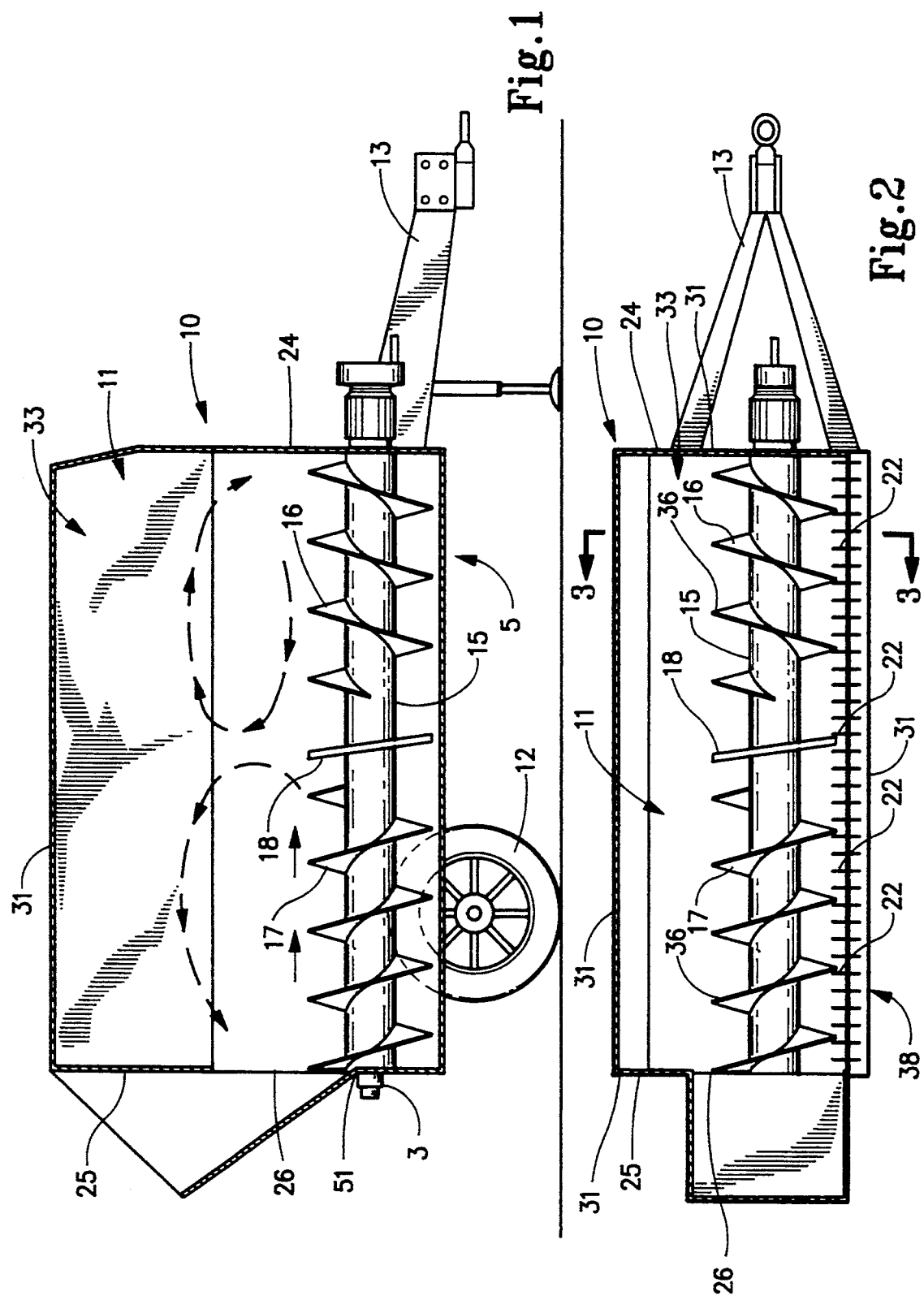

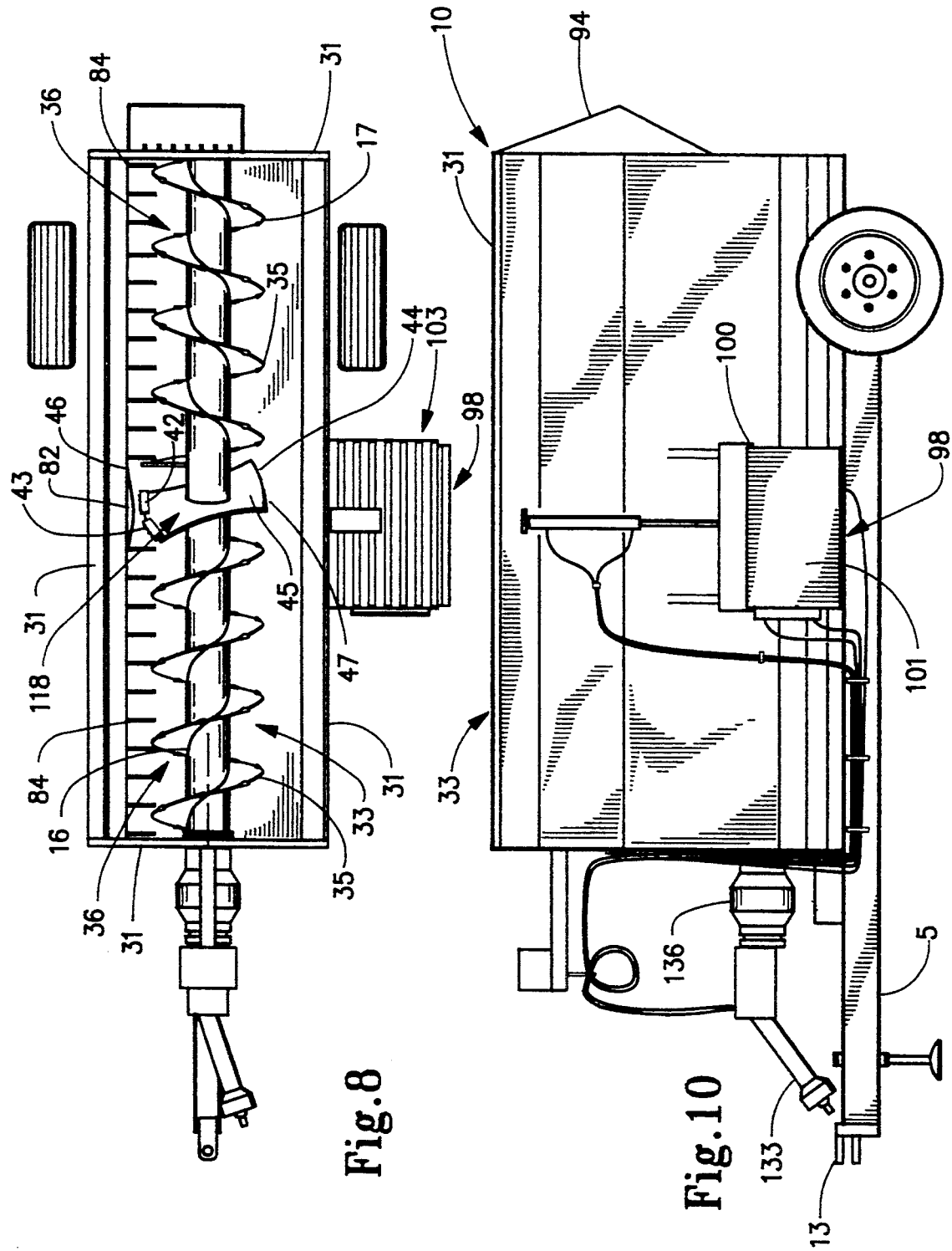

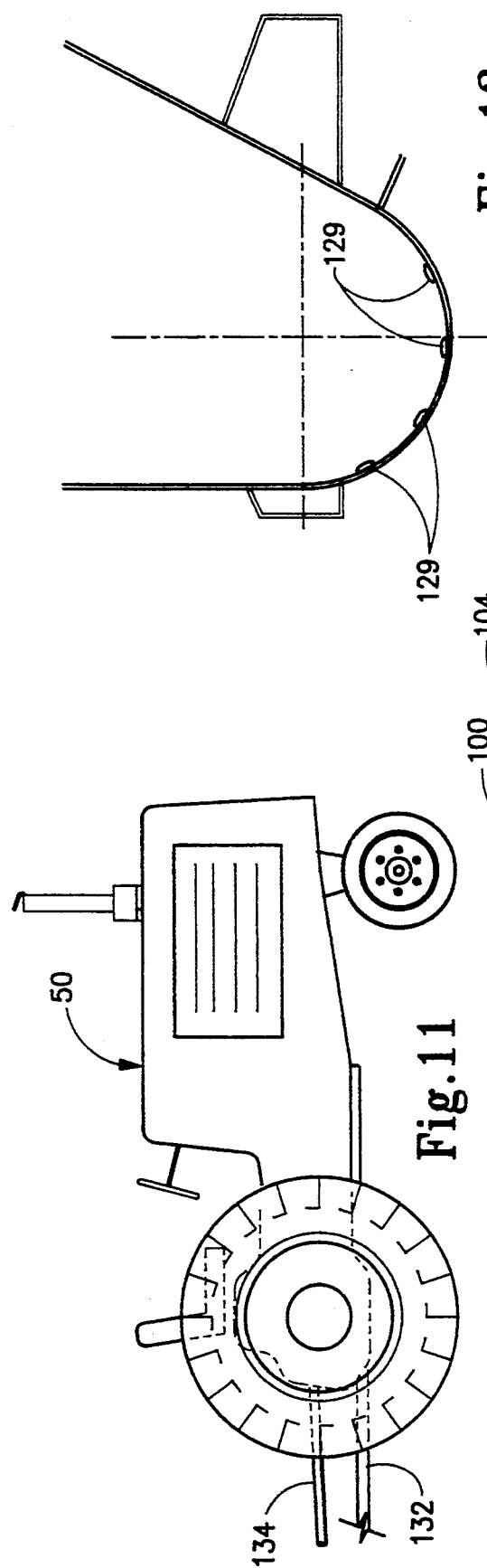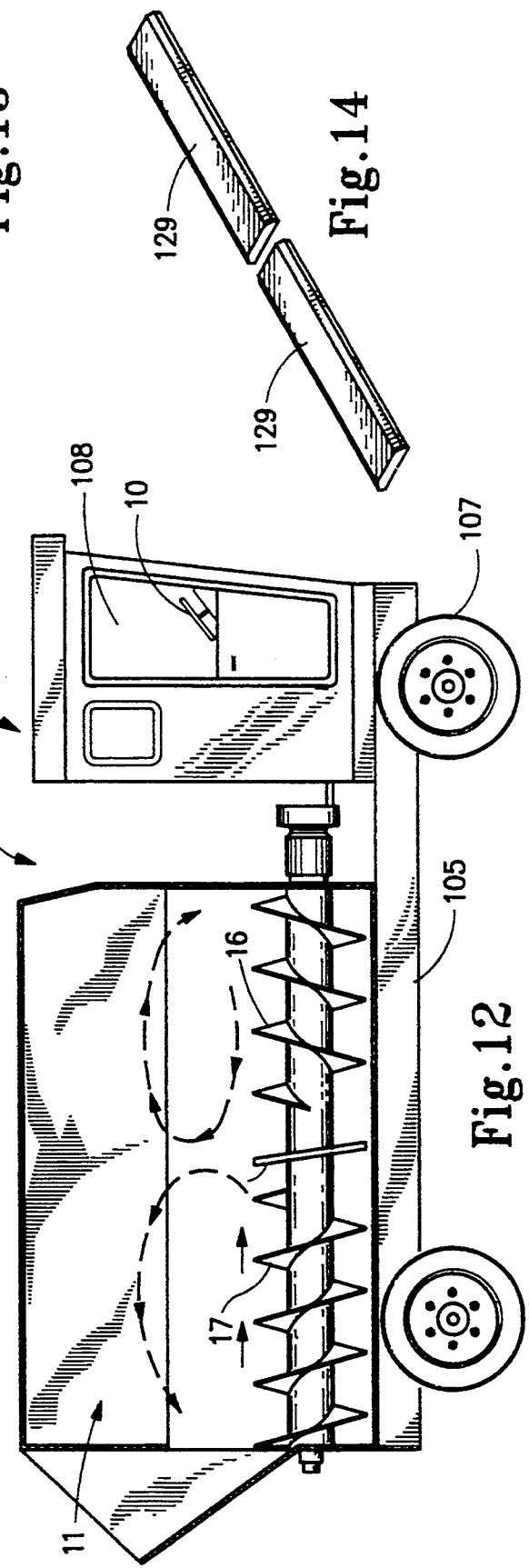

APAPRATUS FOR CUTTING AND MIXING FIBROUS PRODUCTS

The present application is a continuation-in-part of my prior application U.S. Ser. No. 08/064,244 filed in the United States Patent and Trademark Office on Dec. 3, 1992 entitled "EQUIPMENT/APPARATUS WITH ONE HORIZONTAL AUGER FOR CUTTING UP AND MIXING OF FIBROUS PRODUCTS USED FOR THE PREPARATION OF ANIMAL FEED".

FIELD OF INVENTION

The present invention relates to an apparatus for cutting and mixing fibrous products. More particularly to an apparatus that employs a single auger for cutting and mixing of fibrous product used in the preparation of animal feed. The apparatus can be mounted for stationary use or it can be adapted to be towed or self-propelled.

BACKGROUND

The equipment used for cutting and mixing of fibrous product in preparation of animal feeds, typically includes a hopper. In this hopper there is various equipment installed such as types of cutting mechanisms and augers are for cutting and mixing of fibrous products such as dry hay, silage, straw and alfalfa, which are loaded into the top of the hopper.

Equipment for cutting and mixing of fibrous product used in preparation of animal feed most often employs augers which are positioned either horizontally or vertically within the hopper. After the fibrous product is sufficiently cut and mixed by the auger mechanism, it is discharged out of a door.

The equipment having horizontal augers have a smaller height and width then the equipment having vertical augers. However, using the equipment having horizontal augers is practical only for limited production runs or in places where there is a limited space.

Prior art horizontal cutting and mixing equipment contain a plurality of augers. For example, one or two augers may be located on the bottom of the hopper and two or three augers may be located above these. The augers operate cooperatively to cut and mix the product in such a manner as to compress and release the product so it does not stagnate.

Prior art equipment made with several augers arranged either side by side or one over another one, are very expensive to build and to operate, and requires complicated transmission systems connected with the augers and the drive shaft.

Moreover, the known equipment fabricated with several augers, does not satisfactorily perform the mix and cut of the fibrous product. Within the hopper, there are dead spots where material stagnates and this is not cut or mixed. The known types of equipment which utilize several vertical augers, have larger dimensions than the horizontal auger equipment and therefore are more difficult to operate inexpensively.

Thus, a need exists to avoid the prior art difficulties of the known equipment. The present invention is extremely functional and can be built inexpensively and in smaller sizes. However, the present invention, although employing a single, horizontally positioned auger, can operate for unlimited production runs.

SUMMARY OF THE INVENTION

An object of the present invention is to provide an inexpensive, single auger apparatus capable of mixing and cutting raw feed material into a smaller finished product.

A further object of the present invention is to provide a mixing and cutting apparatus that cuts animal feed material consistently into a smaller finished product without stagnation of uncut product within the apparatus.

Another object of the present invention is to provide a self-propelled mixing and cutting apparatus.

Another still further object of the present invention is to provide an apparatus for cutting and mixing heavy or wet feed material into consistently smaller sized pieces which are more readily digestible by animals.

Broadly, the present invention encompasses an apparatus adapted to reduce fibrous animal feed material from a larger raw size to a smaller finished size. The apparatus of the present invention comprises a hopper, a cutting means and a circulating means. The hopper has an interior chamber adapted to receive the animal feed material. The cutting means are adapted for reducing the raw size of the feed material to the smaller finished size. The cutting means includes cutting blades having a plurality of stationary cutting blades operably disposed in the chamber and positioned to reduce the raw size of the feed material to the finished size when the feed material is circulated in the chamber. The circulating means are positioned within the chamber in a spaced-relation to the stationary cutting blades for circulating the feed material against the stationary cutting blades whereby the animal feed material is cut from the raw size to the finished size.

More specifically this apparatus contains a hopper having a bottom portion connected to a first end wall, a second end wall, a first sidewall and a second sidewall which define an interior chamber adapted to receive animal feed material. The apparatus also includes a single auger for circulating, mixing and cutting the animal feed within the chamber. The auger includes a first set of auger flightings positioned to circulate the animal feed in a clockwise direction and a second set of auger flightings positioned to circulate the animal feed in a counterclockwise direction whereby the animal feed material is thoroughly mixed and circulated within the interior chamber. The invention also includes a cutting means positioned within the interior chamber for cutting or shearing the circulating animal feed material.

The interior chamber includes a semi-cylindrical bottom portion connected to the first and second end walls and extending upwardly to form the first and second sidewalls. The first sidewall projects upwardly in a substantially vertical plane from the bottom portion, and the second sidewall projects at an oblique angle to the first side wall. The invention includes cutting means for reducing the raw material size to the smaller finished size and circulating means for circulating the cut feed within the semi-cylindrical bottom portion of the interior chamber. The invention has a first set of auger flightings and a second set of auger flightings, and an intermediate partition therebetween that is adapted to disperse the feed material within the interior chamber. The intermediate partition is attached to the auger shaft such that the intermediate partition separates the first and second set of auger flightings.

The structural and functional characteristics of this invention and its advantages compared to known techniques are more clearly defined by the following description based on the enclosed drawings, which shows an exemplary embodiment.

BRIEF DESCRIPTION OF DRAWINGS

In the drawings:

FIG. 1 is a lateral elevation in partial cross section which shows the invention;

FIG. 2 is a top view of the present invention;

FIG. 8 is a top planar view of an alternative embodiment of the present invention;

FIG. 10 is a side elevational view of the housing and discharge chute of an alternative embodiment of the present invention;

FIG. 11 is a side elevational view of a tractor; elevational view of a tractor;

FIG. 12 is a side elevational view in partial cross section of a self-propelled embodiment of the present invention;

FIG. 13 is partial cross section of the hopper showing the placement of the bar;

FIG. 14 is a perspective view of the bar.

DETAILED DESCRIPTION

Figure 3:
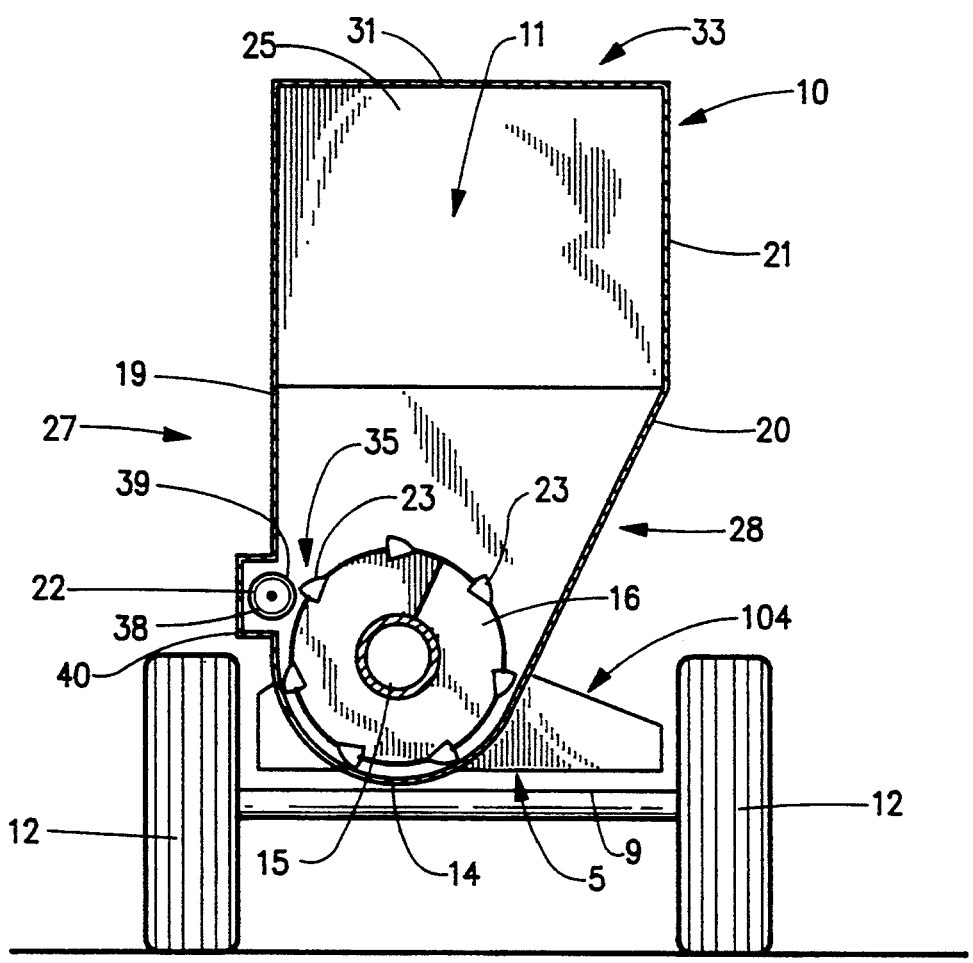
FIG. 3 is a cross-section of the present invention about lines 3—3 of FIG. 2.

The present invention relates to an apparatus that employs a single auger within a hopper for cutting and mixing of fibrous products used as animal feed. Broadly, the present invention includes a hopper, cutting blades for cutting, an auger with flightings and an intermediate partition for circulating the material within the interior of the hopper.

The invention is a power driven apparatus having an auger mechanism supported by a bearing at the end wall 25 of the hopper. The auger 15 is adapted to force the feed material within the hopper toward the central paddle 18 while the feed is being cut or sheared into small pieces. As the auger 15 rotates the feed material is cut and forced to the center of the hopper where it can be discharged into feed troughs.

The present invention more specifically as is shown in FIG. 1 has a hopper 11 mounted on the frame 5. The hopper 11 includes first and second end walls 24, 25 and first and second sidewalls 27, 28 and the bottom section 14 and located oppositely there of an open upper section 34. One of said first and second sidewalls 27, 28 is substantially vertical and forms vertical wall 19. The other of said first and second sidewalls is located oppositely of the vertical wall 19 and extends upwardly from the bottom section 14 at an oblique angle to vertical wall 19, thus forming an oblique wall 20. Extending upwardly from said oblique wall 20 is an upper wall portion 21 that is substantially parallel to the vertical wall 19. Upper wall portion 21 terminates at an upper rim 31.

Likewise, vertical wall 19 terminates in an upper rim 31. Vertical wall 19 and oblique wall 20 are connected one to another by bottom section 14, and vertical wall 19 and oblique wall 20 are likewise connected to the first and second end walls 24 and 25 which also terminate in an upper rim 31 to form an interior chamber 33. The upper rim 31 defines an upper inlet opening 32 to the interior chamber 33.

The bottom section 14 of the hopper 11 is formed in the general shape of a half cylinder or a channel 104 which is adapted to carry the auger shaft 15 therein. The auger shaft 15 lies in the channel 104 and extends between said first and second end walls 24 and 25 so that the auger shaft 15 is substantially perpendicular to vertical wall 19. The end wall 25 carries a bearing 3 in which the end 51 of the auger 15 is journalled.

In FIG. 3, we can clearly see the auger shaft 15 is located so it can rotate within the hopper in an asymmetrical position compared to the central longitudinal plane of the hopper 11. The central longitudinal plane of the hopper intersects the mid points of the upper rim 31 of the end walls 24 and 25. The positioning of the auger 15 is important to the operation of the present invention as is described below.

Installed in the hopper bottom section 14 is the single auger 15 which includes a set of clockwise blades section 16, and a set of counterclockwise blades section 17. An intermediate partition 18 divides these two sections 16 and 17 with the purpose that will be explained.

The circulating means which includes the auger 15 and sections 16 and 17 are positioned in the interior chamber 33 in a spaced relationship to cutting blades 35 which permit the feed material to be cut or sheared into smaller sizes by the cutting blades 35. As is shown in FIG. 2 and FIG. 3 in the first embodiment there are cutting means located within the interior chamber 33. The cutting means includes cutting blades 35 which are adapted to reduced the raw size of animal feed material placed within the interior chamber 33 to a smaller finished size which is readily digested by the animal. For example material such as corn stalks, silage, grains, alfalfa and the like can be loaded into the interior chamber 33 after being harvested, and the apparatus 10 can be operated to reduce the size of the material to smaller digestible portions. It should be noted that the size of the finished product will be determined by what animal is to be fed and the length of time the material was processed by the apparatus 10.

The cutting blades 35 are located on the vertical wall 19 and can be located on the flightings 36 which are located on the auger 15. The cutting blades 35 on the vertical wall 19 are formed as counterknives 22. These counterknives are formed as discs 38 in the first embodiment. The discs 38 only have a portion of their cutting surface 39 exposed to the feed material in the interior chamber 33. When the exposed portion of the discs 38 cutting surface becomes dull the discs 38 are rotated to expose a new portion of their cutting surface 39. The use of the disc shaped counterknives 22 as shown in the first embodiment includes forming a recessed portion 40 in the vertical wall 19. This recessed portion 40 adds to the cost of manufacturing the invention 10; however, the use of rotatable discs 38 increases the length of the useful cutting time for the customer using the invention.

Figure 6:
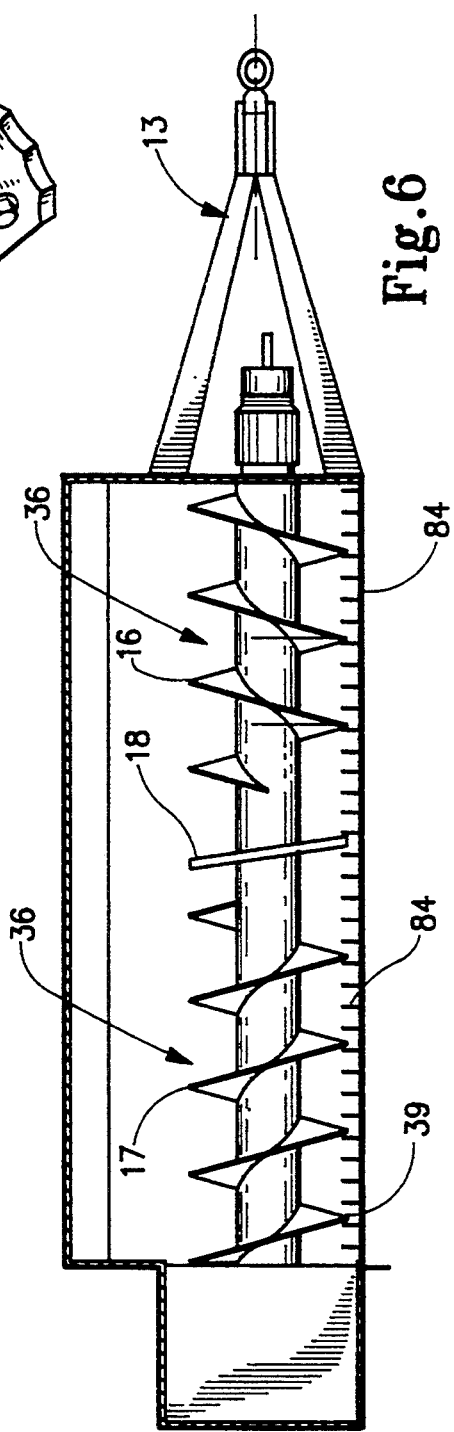
FIG. 6 is a top planar view of an alternative embodiment of the present invention.
Figure 7:
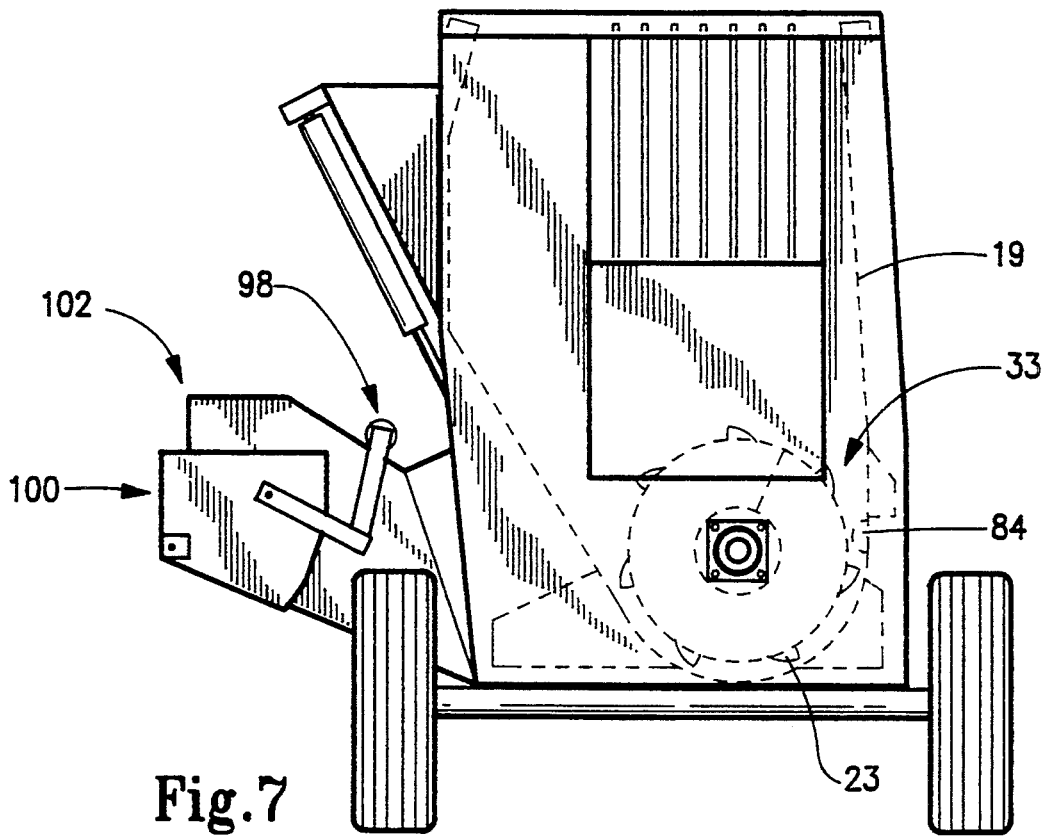
FIG. 7 is a rear elevational view of the present invention with a hopper.

An alternative embodiment of the present invention 10 is shown clearly in FIGS. 6 and 7. In this embodiment the counterknives 22 are only half discs 84 which are not rotatable but instead are securely attached directly onto vertical wall 19 by welding or other known methods. As can be seen, this eliminates the need for a recess to be formed in wall 19. Thus, portions of the feed material do not become lodged in the recessed potion 40 as can happen with the first embodiment.

FIGS. 1, 2, 6 and 8 show top views and a side view of the flightings 36 which are attached to the auger 15. The flightings 36 include first flighting set 16 and a second flightings set 17 which are divided by intermediate partition 18 or paddle 18, preferably the paddle 18 is located equal distance between the first flighting set and the second flighting set on the auger 15. The flightings 36 are positioned to rotate the material in two different flow patterns as shown in FIG. 1. The positioning of the two sets of flightings is adapted to force the feed material to the center of the auger 15.

Figure 4:
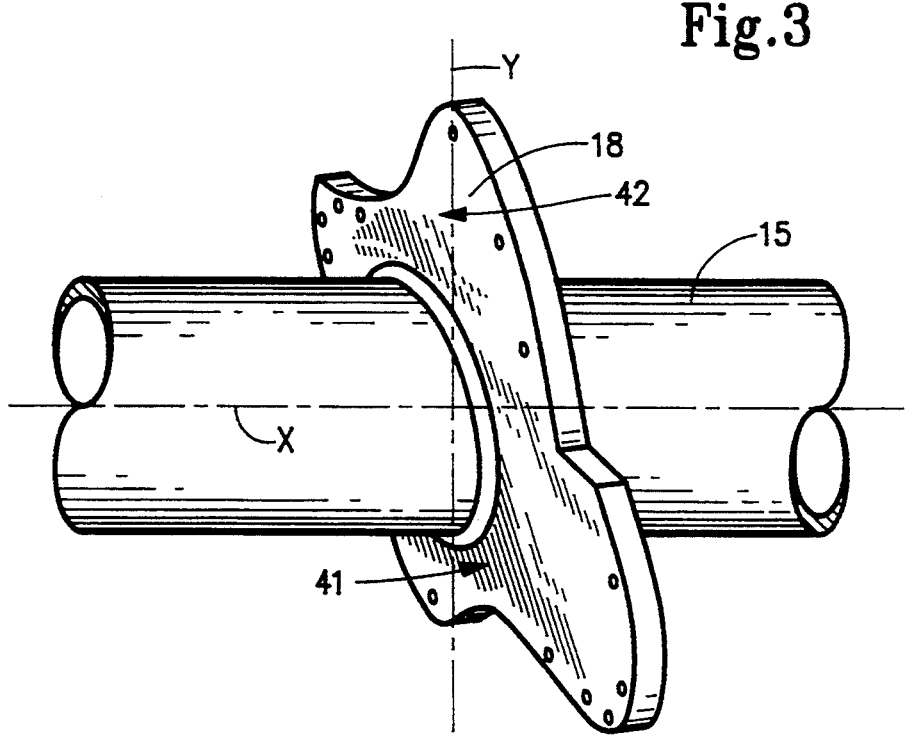
FIG. 4 is a perspective view of the intermediate partition in one embodiment of the present invention.
Figure 5:
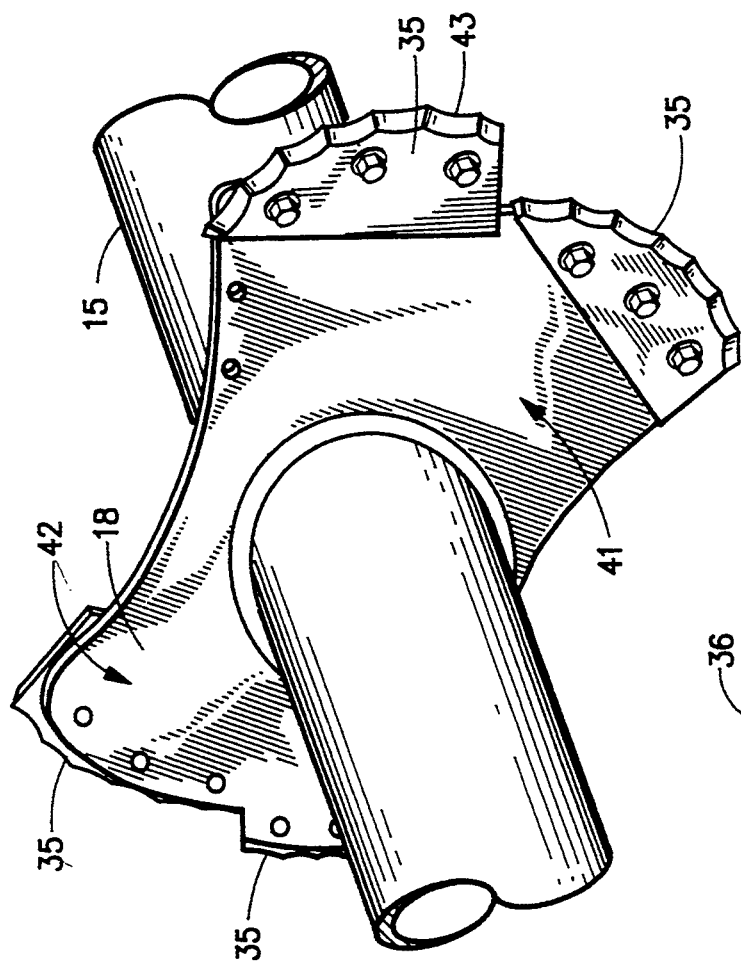
FIG. 5 is a perspective view of the intermediate partition of an alternative embodiment of the present invention.

Paddle 18 is most clearly shown in FIG. 4 and 5. The intermediate partition 18 is assembled and solidly attached to the auger beam 15, with a slight double inclination in relationship to the X and Y axis which intersect perpendicularly in the symmetrical center of partition 18 (FIG. 4 and 5). As you can clearly see in FIGS. 4 and 5, such partition 18 is molded or shaped with diametrically opposite lobes 41. One angled lobe 41 permits the material to be tossed backwards and to the left, the other angled lobe 41 permits the cut material to be tossed backwards and to the right. Thus the paddle sprays the material on the wall forcing the material back towards the end walls. The action of the flightings then moves the material back to the center and the paddle 18.

FIG. 4 shows the paddle 18 without cutting blades 35; alternatively, FIG. 5 shows the paddle 18 with cutting blades 35. The angled shape and position of the paddle 18 is adapted to cooperate with the shape of the bottom section 14 and the oblique and vertical walls 20 and 19 respectively to circulate the material in a continuous flow of material to the center by the action of the first and second set of flightings 16 and 17. The paddle 18 is operative to scoop the material and toss it against the sidewall, particularly the vertical wall 19, in a manner that scatters the material so it sprays back across the first and second sets of flightings 16 and 17. Thus the flightings and the paddle, in combination with the unique shape of the hopper 11 act to permit ready circulation of the feed material without stagnation. The continuous circulation is essential for the consistent even cutting and shearing of the product into the reduced size.

Furthermore, the present invention includes another element that assists circulating and shearing of the product. In FIG. 13 the channel 104 is shown in partial crossection. Located on the interior portion 130 of the channel 104 are outwardly projecting metallic bars 129 that perform two functions. The first function is to protect the bottom portion of channel 104 from excessive wear. The second function is to assist in cooperating with the cutting blades 35 to shear the material. FIG. 14 shows that the bars 129 run lengthwise. When positioned in channel 104 between the end walls the bars 129 run parallel with the auger 15.

The present invention can include one or more sets of cutting blades 35. As can be seen in FIG. 2, the invention 10 can have discs 38 which cut the circulating animal feed by having the feed rotated against the cutting surface by the paddle 18 and the flightings 36 in a type of shearing action. In an alternative embodiment of the present invention the cutting blades can include not only stationary cutting blades such as counterknives 22 shown in FIGS. 6 and 7 but also cutting means such as rotating knives 23 which are securely attached to the flightings and/or to the paddle 18. The cutting blades 35 can be attached by welding, bolts and/or rivets or by other methods commonly used by those skilled in the art. The knives 23 are attached to the flightings 36 so that they project upwardly and/or outwardly therefrom exposing a cutting edge to the material within the interior chamber 33. These knives 23 act cooperatively with the bars 129 and the counterknives 22, 84 to cut or shear the material into smaller pieces. The knives 23 can included serrated edges to further facilitate the cutting and circulating function of this invention. The knives 23 and the counterknives 22 are located in a slightly spaced apart relationship to permit the flightings 36 to freely rotate without undue friction from contact with the cutting blades 35.

Turning to FIGS. 5 and 8 the cutting blades 35 on the paddle 18 can be clearly seen. The blades are serrated. FIG. 5 has serrated blades located on the terminal portion of the first and second lobes 41 and 42 respectively of the paddle 18. The cutting blades 35 are positioned to have one set of scalloped blades 43 primarily facing the first end wall 24 and the second set of scalloped blades 44 primarily facing the second end wall 25. Additionally as shown in FIG. 8 the paddle 118 can have cutting blades 35 located on the side edges 45 and 46 of the lobes 41, 42. These additional side edge blades cannot, due to their position, cooperate with the counter knives 22. However, these side edge blades 47 do shear the material as it is circulated and helps prevent stagnation of the material.

The Inventor has perceived that when certain types of wet or heavy feed material are placed in the interior chamber 33 the material is not always evenly circulated by the auger 15 and the paddle 18. Although the channel bottom 104 permits the ready rotation of the material by the auger 15, and the oblique wall 20 permits the gradual upward circulation of the material toward the paddle 18 which then scoops the material upwardly and backwardly toward one side or the other, the weight of the wet or heavy material causes it to drop directly down vertical wall 19 when tossed by the paddle 18 against it, instead of spraying the wall 19. In response to this circulation problem the Inventor positioned a wedge shaped projection 82 shown in FIGS. 8 and 9 on wall 19. The projection 82 can be in the form of an inverted triangular shaped pyramid or a triangular shaped prism. Regardless of the shape, what is essential is that projection 82 is operative to assist the spread of the material tossed by the paddle 18 along the auger 15.

Figure 9:
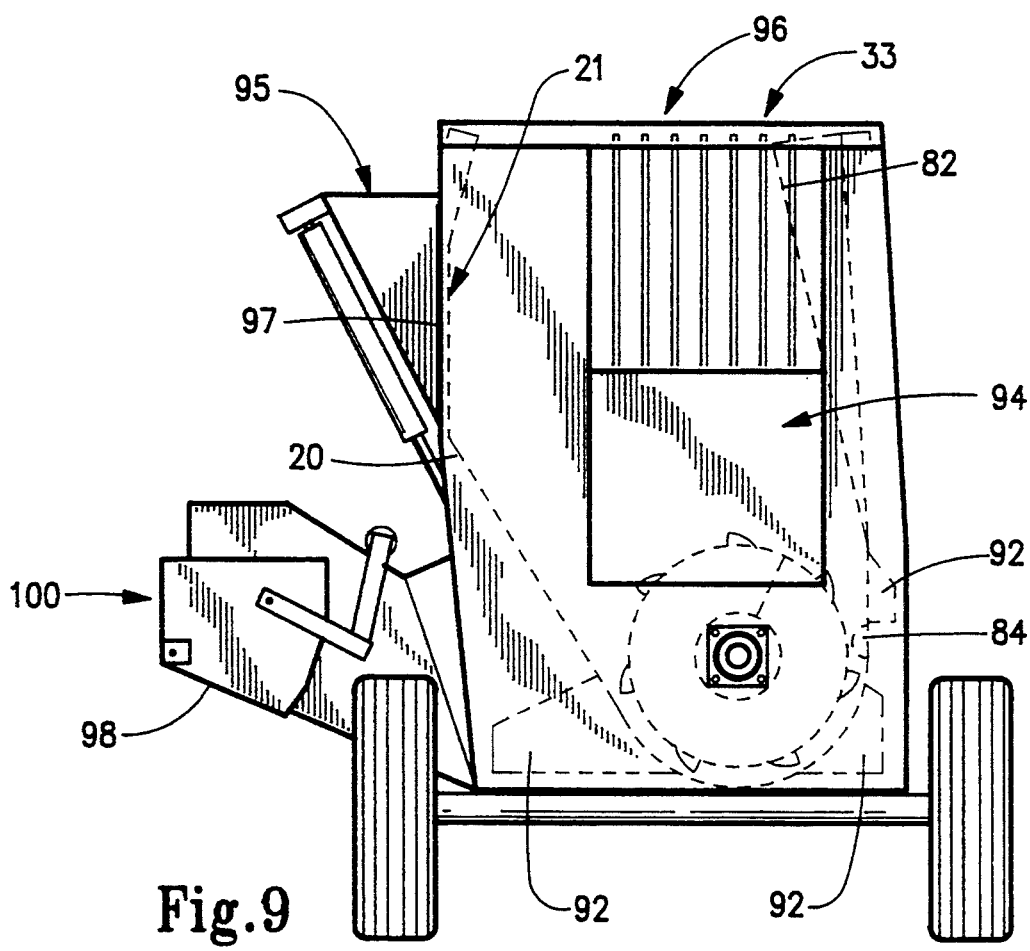
FIG. 9 is a rear elevational view of an alternative embodiment mounted in a housing.

The shape of the hopper 11 is such that it can be readily mounted into a housing 91 such as a wagon. As is shown in FIG. 9 the hopper 11 can be supported by supports 92 within a standard wagon. When the hopper 11 is mounted within a housing such as a wagon the end walls 24 and 25 can be formed by the wagon or can be formed as part of the hopper 11. In FIG. 9 the end walls are formed by the housing 91.

As is known to those skilled in the art a wagon can have a variety of inlets into the interior chamber 33. FIG. 9 clearly shows that feed material can be loaded through the back inlet 94 or the side inlet 95 or the top 96. The hopper's wall portion 21 that extends upwardly from the oblique wall 20 should be modified to contain an access region 97 for feed to enter the interior chamber 33 if a side inlet 95 is desired. A variety of these access regions of course, can be provided for.

Likewise, the hopper and the housing (if one is used) should contain an unloading region 98. An example of an unloading region 98 is shown in FIGS. 7 and 10 as discharge region 102 including chute 100. Chute 100 is located on wall 20 opposite of the row of spaced apart semi-circular knives 84 which are welded on wall 19. The chute 100 can be hydraulically operated as shown in FIG. 10 or manually operated. When the door 101 to discharge chute 100 is opened hydraulically the discharge chain is engaged and feed flows out of chute 100. The chute 100 can include an elevator extension 103 when in the open position such as is shown in FIG. 8. There are various unloading chutes known in the art that could be implemented.

The preferred method of operating this apparatus requires the use of a farm vehicle such as a tractor 50 (FIG. 11). The apparatus 10 is structurally formed by a metallic hopper 11, that is mounted to a frame 5 with wheels 12 and is operative to be pulled by equipment such as a tractor 50 or the like. More specifically my preferred apparatus includes a frame 5 mounted on the axle 9 with no drive mechanism required. The frame 5 is operative to be hitched by a tongue 13 or pull bar to a tractor 50 or a vehicle so that the invention is readily movable between locations. (See FIGS. 1 and FIGS. 11)

Looking at FIGS. 10 and 11 in combination it can be readily seen that the tongue 13 on the frame 5 is hitched to the tractor 50 by the usual draw bar 132. The power shaft 133 is connected to the power take-off 134 of the tractor 50. This shaft 133 is attached to a gear reduction planetary drive unit 136 that drives the auger 15 when the power take off is engaged. Depending on the size of the present invention the reduction ratio is usually between 25:1 or 31:1. The apparatus 10 can be pulled and powered by the tractor 50.

Alternatively my invention can include means for self propelling as is shown in FIG. 12. The self propelled embodiment includes the frame 105, a motor and steering mechanism 106 and directional steering wheels 107, operator station 108 and preferably electrical and hydraulic systems. To be a self propelled system the frame 105 and chassis 104 have to be securely attached one to another to form the present invention 10.

In operation the various embodiments of the present invention perform as follows. The fibrous material is loaded into the hopper 11 from the top or from the back opening 26 or the side inlet. The material is pushed by the clockwise blade section 16 and the counterclockwise blade section 17 of the auger 15 toward the center against the center partition 18. The material is then pushed up and outwardly by the partition 18 toward the end walls 24 and 25 of the hopper 11, in the direction of arrows in FIG. 1 with a continuous movement such as a "fountain".

The oblique wall 20 assures the continuous movement downward sliding movement of the material toward auger 15. The tossing or scooping of the material by the paddle 18 on to the opposite vertical wall 19 is operative to spray the material both left and right and stop the stagnation of material, so that there is always contact with the auger which transports the material back toward the center until the material reaches the partition 18. Each rotation of the feed material continuously brings the material in contact with the cutting blades 35 which are cutting and shearing the material into smaller and smaller pieces. The cooperation between the blades on the flightings 36 and the bars 129 located on the bottom of channel 104 and the stationary blades 22, 84 to effectively cut and shear the material whereby reducing the size of the raw material to a finished size which can then be discharged out chute 100, and can be fed to animals or stored for future use. The combination of this unique configuration of the hopper 11 and the single auger 15 results in optimal mixing of product and this positively effects the quality of the animal feed output.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. An apparatus adapted to reduce animal feed material from a raw size to a smaller finished size of, said apparatus comprising:
    a hopper having an interior chamber adapted to receive the animal feed material;
    a cutting means including cutting blades for reducing the raw size to the smaller finished size including a plurality of stationary cutting blades operably disposed in said chamber and positioned to reduce the raw size of the feed material to the finished size when the feed material is circulated in said chamber; and
    circulating means positioned in said chamber in a spaced-relation to said cutting blades for circulating the feed material against said cutting blades whereby the animal feed material is cut from the raw size to the finished size.

2. An apparatus adapted to process animal feed material having a first raw size to form an animal feed material having a second smaller finished size, said apparatus comprising:
    a hopper having a bottom portion connected to a first end wall and a second end wall, a first sidewall and a second sidewall which define an interior chamber adapted to receive animal feed material;
    a single auger for circulating, mixing and cutting the animal feed within the chamber, said auger including a first set of auger flightings positioned to circulate said animal feed in a clockwise direction and a second set of auger flightings positioned to circulate the animal feed in a counterclockwise direction whereby the animal feed material is thoroughly mixed and circulated within the interior chamber;
    cutting blades positioned within said interior chamber for shearing the animal feed material which is in the raw size to form the animal feed material in the second smaller finished size; and
    an intermediate partition adapted to disperse said feed material within said interior chamber, said intermediate partition disposed within said interior chamber such that said intermediate partition separates said first and second set of auger flightings.

3. An apparatus adapted to reduce animal feed material from a raw size to a smaller finished size, said apparatus comprising:
    a hopper having an interior chamber adapted to receive animal feed material; and
    said interior chamber including a semi-cylindrical bottom portion, a first end wall, a second end wall, a first sidewall, and a second sidewall said first sidewall projecting upwardly in a substantially vertical plane from said bottom portion, said second side wall projecting at an oblique angle to said first sidewall;

cutting blades for reducing the raw material size to the smaller finished size and circulating means including an auger for circulating the feed positioned within said semi-cylindrical bottom portion, said auger having a first set of auger flightings and a second set of auger flightings; and an intermediate partition adapted to disperse said feed material within said interior chamber, said intermediate partition attached to said auger such that said partition separates said first and second set of auger flightings.

* * * * *